US009046402B2

(12) United States Patent
Ferren et al.

(10) Patent No.: US 9,046,402 B2
(45) Date of Patent: Jun. 2, 2015

(54) METHOD OF MEASURING AMOUNT OF SUBSTANCES IN AN AMBIENT NOISE ENVIRONMENT

(75) Inventors: Bran Ferren, Beverly Hills, CA (US); Nathan P. Myhrvold, Medina, WA (US); Clarence T. Tegreene, Bellevue, WA (US)

(73) Assignee: The Invention Sciencefund I, LLC, Bellevue, WA (US)

( * ) Notice: Subject to any disclaimer, the term of this patent is extended or adjusted under 35 U.S.C. 154(b) by 2058 days.

(21) Appl. No.: 10/930,425

(22) Filed: Aug. 31, 2004

(65) Prior Publication Data

US 2006/0042869 A1    Mar. 2, 2006

(51) Int. Cl.
*G01F 23/296* (2006.01)
*G01F 17/00* (2006.01)

(52) U.S. Cl.
CPC .............. *G01F 17/00* (2013.01); *G01F 23/296* (2013.01); *G01F 23/2966* (2013.01)

(58) Field of Classification Search
USPC ........................................................ 73/290 V
See application file for complete search history.

(56) References Cited

U.S. PATENT DOCUMENTS

| 5,251,482 A * | 10/1993 | Bates et al. ................. 73/290 V |
| 5,853,005 A * | 12/1998 | Scanlon ........................ 600/459 |
| 6,545,946 B1 * | 4/2003 | Huss et al. ...................... 367/99 |
| 2003/0015036 A1* | 1/2003 | Young et al. ................... 73/579 |

OTHER PUBLICATIONS

Los Alamos National Laboratory, "Noninvasive Chemical Concentration Analyzer (NCCA) Preserves Process Stream Purity" pp. 1-3, bearing a date of Spring 1996, located at http://www.lanl.gov/gov/orgs/nmt/nmtdo/AQarchive/95summer/NCCA.html, printed on Jun. 15, 2004.

* cited by examiner

*Primary Examiner* — Paul West
(74) *Attorney, Agent, or Firm* — Advent, LLP

(57) ABSTRACT

Embodiments of the invention include methods, devices, and systems that measure a volume of substance in a noise environment.

24 Claims, 6 Drawing Sheets

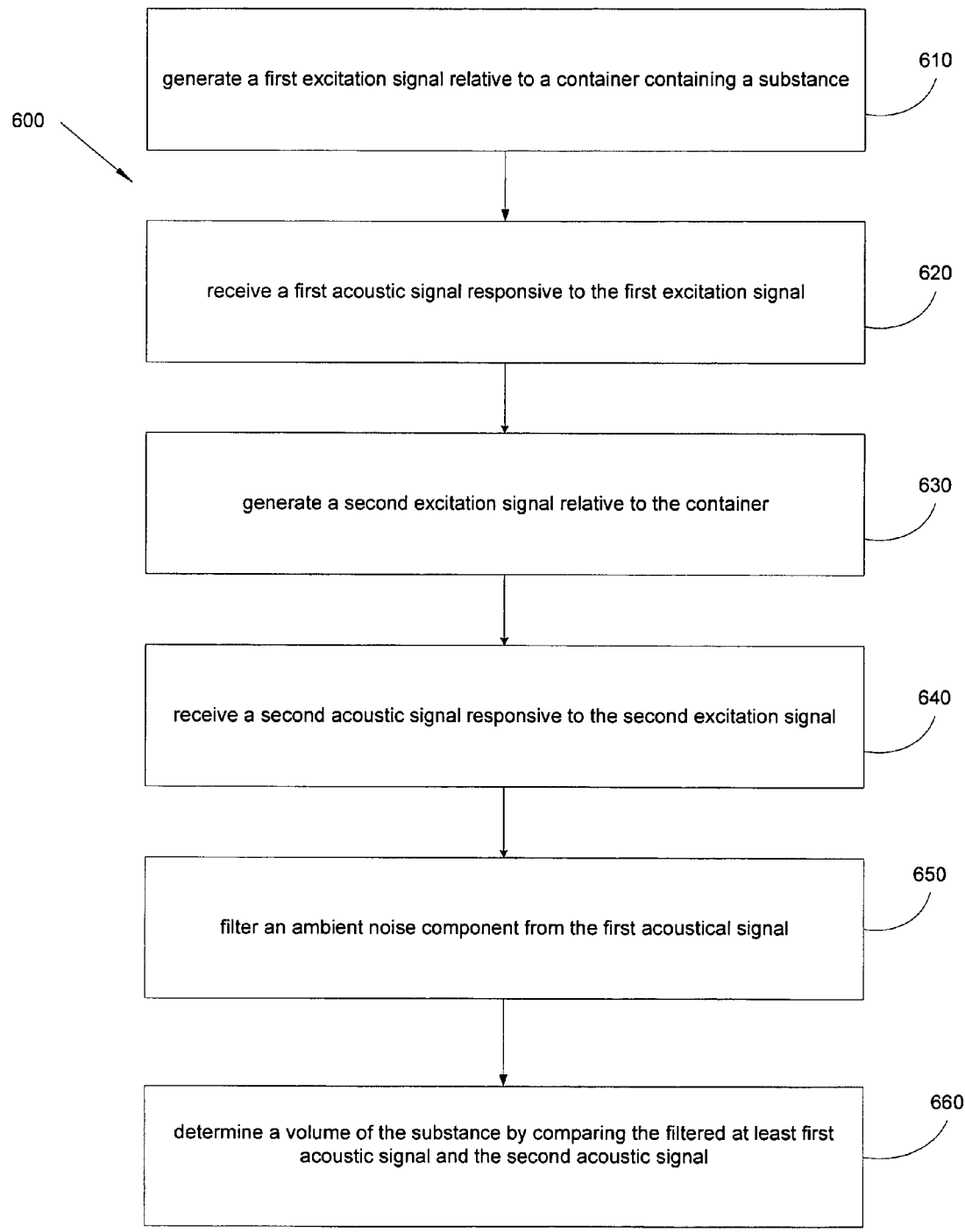

METHOD OF MEASURING AMOUNT OF SUBSTANCES IN AN AMBIENT NOISE ENVIRONMENT

RELATED APPLICATION AND PRIORITY

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s); the present application also claims the earliest available effective filing date(s) from, and also incorporates by reference in its entirety all subject matter of any and all parent, grandparent, great-grandparent, etc. applications of the following listed application(s):

U.S. patent application Ser. No. 10/883,929 titled Method of Measuring Amount of Substances, and filed Jul. 2, 2004.

In the event of any inconsistencies between the instant application and an application incorporated by reference, the instant application controls.

TECHNICAL FIELD

The present invention relates generally to techniques to determine amounts of substances in containers.

SUMMARY

An embodiment provides a method. The method includes generating an excitation signal relative to a container, the container being subject to an ambient noise and containing a substance. The method includes receiving an acoustic signal responsive to the excitation signal from at least a portion of the container, reducing an ambient noise component of the acoustic signal, and determining a volume of the substance in the container in response to the acoustic signal having the reduced ambient noise component. Reducing the ambient noise component may include receiving a signal representative of the ambient noise, and modifying the received acoustical signal in response the signal representative of the ambient noise. The modifying may include subtracting the signal representative of the ambient noise from the received acoustic signal. Reducing the ambient noise component may include application of a Fourier transform to the acoustic signal. An alternative embodiment of the method includes a computer-readable media containing computer instructions which, when run on a computer, cause the computer to perform the above method. The computer-readable media may include a computer storage media, which may be carried by a computer readable carrier. The computer-readable media may include a communications media.

Another embodiment provides a system. The system includes a container configured to contain a substance, and a signal generator operable to generate an excitation signal within the container. The system includes an acoustic signal receiver operable to sense acoustic signals within the container, including an acoustic signal responsive to the excitation signal and a noise ambient to the container. The system also includes an analytical instrument operable to receive the acoustic signal responsive to the excitation signal from the acoustic signal receiver, reduce an ambient noise component of the acoustic signal, and determine a volume of the substance in the container in response to the acoustic signal having the reduced ambient noise component. Reducing the ambient noise component may include filtering the acoustic signal, which may include subtracting the ambient noise signal from the acoustic signal. The system may include an engine configured to consume the substance.

A further embodiment provides system. The system includes a container configured to contain a substance, and a signal generator operable to generate an excitation signal within the container. The system includes an acoustic signal receiver operable to sense acoustic signals within the container, including an acoustic signal responsive to the excitation signal. Also, an analytical instrument operable to receive the acoustic signal responsive to the excitation signal from the acoustic signal receiver, reduce an ambient noise component of the acoustic signal, determine a volume of the substance in the container in response to the acoustic signal having the reduced ambient noise component, and provide a signal representative of the determined volume. The system also includes a gauge operable to receive the signal representative of the determined volume of substance and display the determined volume.

An embodiment provides a method. The method includes generating an excitation signal within a container, the container containing a substance and being subject to an ambient noise. The method includes receiving an acoustic signal responsive to the excitation signal from a first acoustic receiver, and receiving an ambient noise signal representative of the ambient noise from a second acoustic receiver. The method also includes modifying the received acoustical signal in response the signal representative of the ambient noise, and determining a volume of the substance in the container in response to the modified acoustic signal.

Another embodiment provides a method. The method includes generating an excitation signal relative to a container containing a substance and subject to an ambient noise. The method includes receiving a first acoustic signal responsive to the excitation signal, and receiving a second acoustic signal representative of the excitation signal. The method also includes reducing an ambient noise component of at least one of the first and second acoustic signals in response to the first and second acoustic signals. A volume of the substance in the container is determined in response to at least one of the first acoustic signal and the second acoustic signal after the reduction of the ambient noise component.

A further embodiment provides a method. The method includes generating a first excitation signal relative to a container containing a substance and subject to an ambient noise. The method includes receiving a first acoustic signal responsive to the first excitation signal. The method includes generating a second excitation signal relative to the container, and receiving a second acoustic signal responsive to the second excitation signal. The method also includes filtering an ambient noise component from the first acoustic signal, and determining the volume of the substance in the container in response to the filtered first acoustic signal. Filtering an ambient noise component may include filtering an ambient noise component common to the first acoustic signal and the second acoustic signal from the first acoustic signal. The method may further include filtering an ambient noise component from the second acoustic signal. Filtering an ambient noise component may include filtering an ambient noise component common to the first acoustic signal and the second acoustic signal from the second acoustic signal. Determining the volume of the substance may include determining the volume in response to the filtered first acoustic signal and the filtered second acoustic signal.

In addition to the foregoing, various other method and/or system aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined by the claims, will become apparent in the detailed description set forth herein.

BRIEF DESCRIPTION OF THE FIGURES

FIG. 6 illustrates exemplary steps of a process 600 that determines a volume of a contained substance in an ambient noise environment.

DETAILED DESCRIPTION

Figure 1:
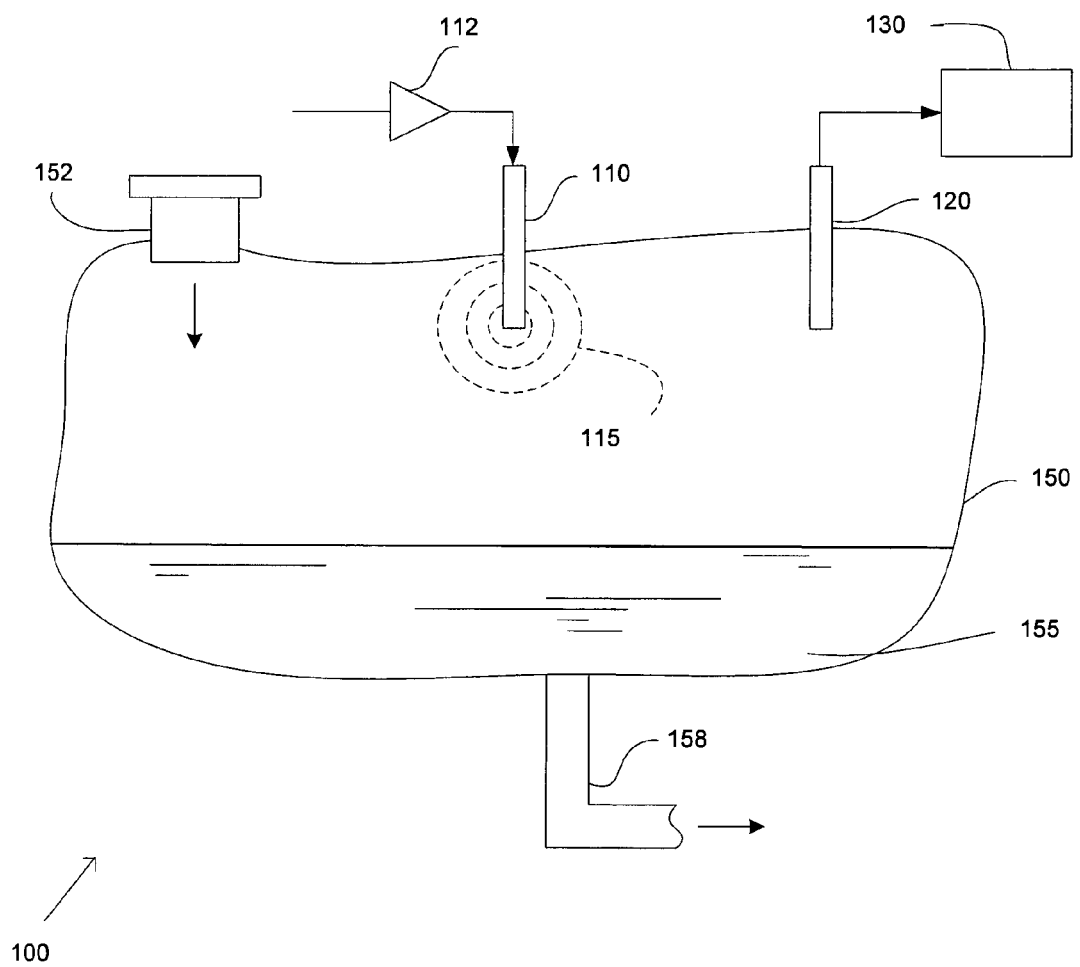
FIG. 1 and FIG. 2 illustrate a system for determining an amount of substance in a container.
Figure 2:
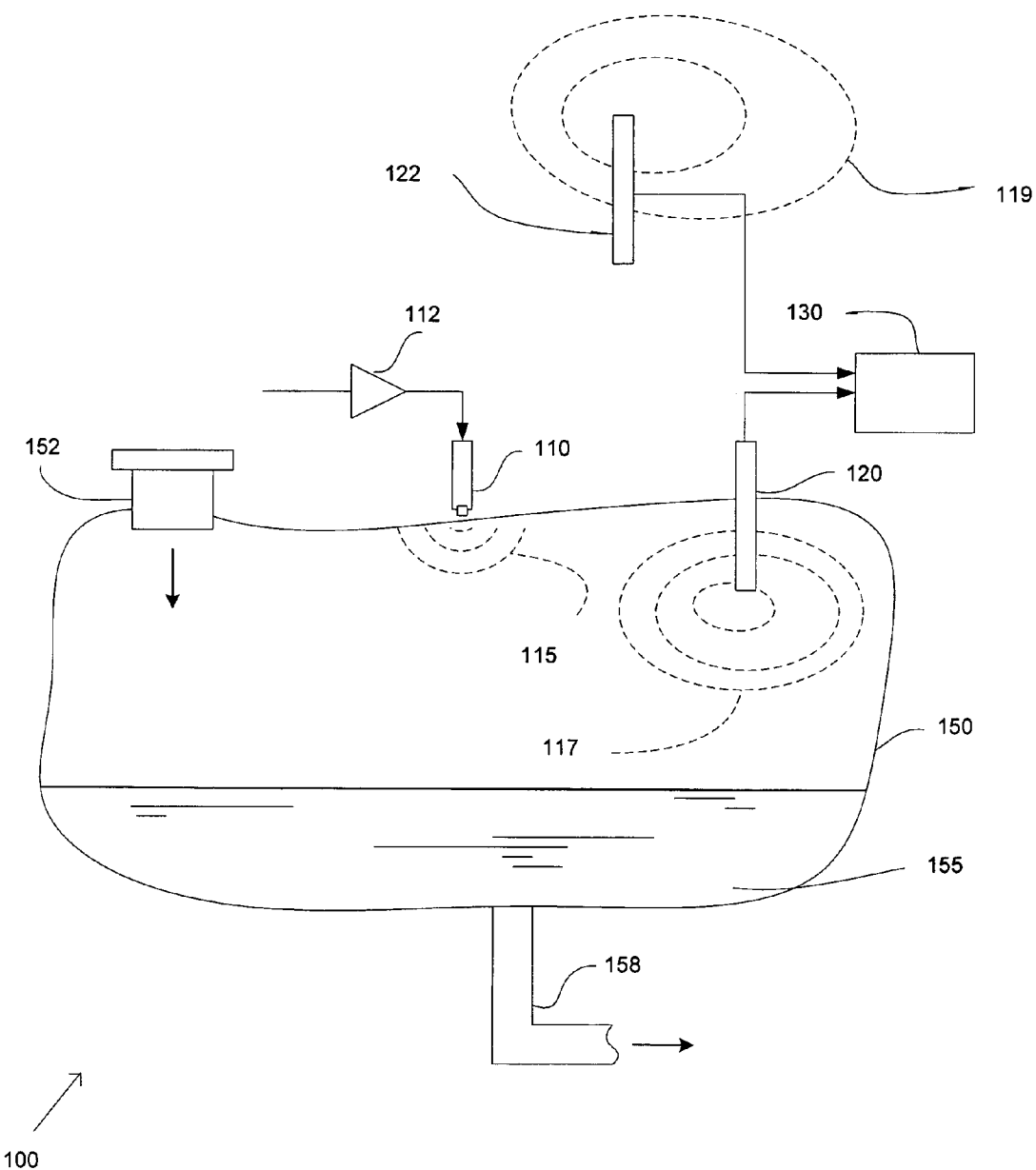

FIGS. 1 and 2 illustrate a system 100 for determining an amount of substance, illustrated as liquid 155, in a container 150. Container 150 can have substantially any shape, such as solid rectangular, hollow ellipsoid sphere, or other kinds of regular shapes. Container 150 can also be irregular in shape. In one implementation, container 150 is a fuel tank. Container 150 can also include an inlet 152 or an outlet 158. Although the term "container" is used herein for sake of clarity, those skilled in the art will appreciate that the container 150 is meant to be representative of substantially any structure that may contain some volume of a substance. The container 150 can be, for example, an open container or an enclosed container. Some examples of container 150 include fuel tanks and/or coolant tanks and/or lubricant tanks of planes, automobiles, trains, ships, submarines, or other kinds of vehicles. Other specific examples of container 150 include fluid reservoirs and/or gel reservoirs and or other material (e.g., sand) reservoirs of industrial equipment (e.g., reservoirs used in refineries, chemical plants, and/or glass plants, etc.). Other specific examples of container 150 include rooms or other building storage areas wherein materials are kept (e.g., wafer storage facilities of semiconductor manufacturing plants). The general term "system" is used herein for sake of clarity, and those skilled in the art will appreciate that system 100 is meant to be representative of substantially any type system wherein container 150 may be utilized, such as planes, automobiles, trains, ships, submarines, military conveyances (e.g., tanks and/or helicopters), industrial facilities (e.g., petro-chemical refineries, chemical plants, nano-technology plants, and/or glass plants, etc.), and/or other systems wherein container 150 may be utilized.

System 100 generally includes an excitation generator 110, an acoustic receiver 120, and an analytical instrument 130. Excitation generator 110 can generate an excitation signal 115 for creating an acoustic signal 117 in container 150. Excitation generator 110 can be an acoustic generator (e.g., a speaker, or a spark generator), an accelerometer (e.g., a piezoelectric accelerometer, an electrodynamic accelerometer, a magnetostrictive accelerometer, or a capacitive accelerometer), or substantially any of other kinds of transducers consistent with the teachings herein. The acoustic signal 117 in container 150 generally is received by acoustic receiver 120. The acoustic signal 117 received by acoustic receiver 120 generally is sent to analytical instrument 130 for further signal processing. Analytical instrument 130 can use any aspect or feature of the received acoustic signal 117, including a signature of the acoustic signal, to determine an amount of a substance, illustrated as the liquid 155, in container 150. Although the term "liquid" is used herein for sake of clarity, those skilled in the art will appreciate that liquid 155 is meant to be representative of substantially any substance that may be enclosed within a volume of space, such as fluids, gels, particulates (e.g., sand, or grains), solids (e.g., semiconductor wafers), etc. Liquid 155 is also meant to be representative of foods, plants, people, or other living stocks.

In one implementation, analytical instrument 130 is operable to compare a spectrum of the received acoustic signal with a list of spectra in a spectra look up table to determine the amount of liquid in container 150.

In another implementation, analytical instrument 130 is operable to find at least one resonant frequency in a spectrum of the received acoustic signal 117, and analytical instrument analytical instrument 130 is also operable to compare the at least one resonant frequency in the spectrum of the received acoustic signal with a list of resonant frequencies in a frequency look up table to determine the amount of liquid in container 150. As an example of how to find the resonant frequencies, analytical instrument 130 can detect a frequency having a maximum strength in the spectrum of the acoustic signal, and designate the frequency having the maximum strength as one of the resonant frequencies.

Some of the implementations for determining the spectrum of the received acoustic signal and the resonant frequencies in the spectrum are described in the following.

In one implementation, excitation generator 110 generates a pulse excitation signal for creating the excitation signal 115 in container 150. Excitation generator 110 can also generate a chirp waveform signal. For determining the spectrum of the received acoustic signal 117 or the resonant frequencies in that spectrum, analytical instrument 130 can transform the received acoustic signal into Fourier space. For example, analytical instrument 130 can digitize the acoustic signal received by the acoustic receiver and conduct a Fourier Transform on the digitized acoustic signal. Analytical instrument 130 can conduct a conventional Discrete Fourier Transform on the digitized acoustic signal or a Fast Fourier Transform on the digitized acoustic signal.

In another implementation, excitation generator 110 generates a substantially white noise excitation signal 115 for creating the acoustic signal 117 in container 150. Analytical instrument 130 can determine the resonant frequencies of container 150 from the received acoustic signal 117. A substantially white noise excitation signal includes excitation signals having spectra that are almost nearly flat in a frequency domain. A substantially white noise excitation signal can also include excitation signals having spectra that are not quite flat in a frequency domain.

In yet another implementation, excitation generator 110 generates a single frequency excitation signal 115 for creating the acoustic signal 117 in container 150 and sweeps the single frequency excitation from a first frequency to a second frequency. The resonant frequencies of container 150 between the first frequency and the second frequency can be determined by analytical instrument 130 using the received acoustic signal 117.

In a further implementation, excitation generator 110 may generate an excitation signal 115 having frequencies in a sonic range, a subsonic range, an ultrasonic range, or a combination of two or more ranges.

In an implementation as shown in FIG. 1, excitation generator 110 can generate the excitation signal 115 interior to container 150 directly (e.g., by injecting energy into an interior of the container with an acoustic generator). In another implementation as shown in FIG. 2, excitation generator 110 can generate the excitation signal 115 in container 150 by exciting a wall of container 150. Excitation generator 110 can include a transducer that makes contact on the outer wall of container 150 (as shown in FIG. 2). Excitation generator 110 can also include a transducer that makes contact on the inner wall of container 150. Excitation generator 110 can also include a transducer that injects energy directly into the interior of the container, where the transducer is not in contact with a wall of container 150. While the embodiment is described with the transducer in contact with the wall or interior, one skilled in the art will recognize that the transducer may couple energy to the inner wall, outer wall, or the interior indirectly. For example, the transducer may launch an acoustic wave a short distance from the inner wall, outer wall, or interior rather than through direct contact. Similarly, the transducer may couple energy indirectly, for example, by generating an acoustic wave in a material coupled directly or indirectly to the inner wall, outer wall, or interior.

In an implementation as shown in FIG. 1, acoustic receiver 120 is positioned interior to container 150. In other implementations, acoustic receiver 120 is positioned outside container 150. In other implementations, acoustic receiver 120 is positioned on or proximate to a wall of container 150.

Excitation generator 110 can receive an electrical signal from an electrical signal generator 112. Electrical signal generator 112 can generate a pulse electrical signal, a chirp waveform signal, a substantially white noise electrical signal, a substantially single frequency electrical signal, or other kinds of electrical signals.

Analytical instrument 130 can include an amplifier to amplify signals received from acoustic receiver 120. Analytical instrument 130 can also include an analog to digital converter for digitizing signals received from an output of the amplifier. The digitized signals can be sent to a Digital Signal Processor (DSP) for further processing. The Digital Signal Processor can perform filtering, windowing, Fourier transform, comparison, or other kinds of operations on the digitized signals.

Analytical instrument 130 can include a memory to store a signature of the acoustic signal 117 in association with a corresponding volume of liquid 155 in container 150. In some implementations, a signature of an acoustic signal 117 in association with a corresponding volume includes a frequency (e.g., 500 Hz) paired with a corresponding volume of a substance in container 150 (e.g., 30 cubic centimeters). The signature of the acoustic signal 117 can include a spectrum of the acoustic signal, a resonant frequency in a spectrum of the acoustic signal, a collection of multiple resonant frequencies in a spectrum of the acoustic signal, several harmonics of the generated acoustic signal or wave, or other detectable characteristics in the acoustic signal.

In some implementations, a display device can be used to display the volume of liquid 155 in container 150. One example of such a display device would include a fuel gauge of a vehicle. Other implementations may include displaying information graphical or textually at monitoring facility or on a portable device.

In an implementation as shown in FIG. 1, the volume of liquid 155 in container 150 may be determined with devices including excitation generator 110, acoustic receiver 120, and analytical instrument 130. In other implementations, other kinds of substances (e.g., gels, sands or other kinds of sand like materials) can be determined with similar techniques.

As specific examples, container 150 can be a fuel tank in a plane, an automobile, a train, a ship, a submarine, or other kind of vehicles.

Analytical instrument 130 can be implemented as a stand alone device. Analytical instrument 130 can also be implemented to include software and/or firmware and/or hardware on another computer system. For example, when container 150 is a fuel tank on an automobile and the automobile has an on-board computer, part of analytical instrument 130 can be implemented as software or firmware on the on-board computer.

In an implementation as shown in FIG. 1, excitation generator 110 is used to generate the excitation signal 115, and acoustic receiver 120 is used for receiving the acoustic signal 117 induced by the excitation signal. In another implementation, excitation generator 110 and acoustic receiver 120 can be implemented as a single device (e.g., the same device can both excite and receive). In still another implementation, multiple acoustic receivers can be used for receiving the acoustic signal 117 induced by the excitation signal 115. For example, in one implementation, multiple acoustic receivers are used to reject common mode background noise.

In addition to those elements previous described, FIG. 2 also illustrates an acoustic receiver 122 used for receiving or sensing an ambient noise 119. As with the acoustic receiver 120, the acoustic receiver 122 may be any device suitable for receiving a sound and generating a signal representative of the sound, such as a microphone and a hydrophone. While the acoustic receiver 122 is illustrated proximate to an exterior portion of the container 150, it may be placed in any location suitable for receiving the ambient noise 119.

The ambient noise 119 may be any unwanted or undesirable noise or sound, such as a noise that corrupts or distorts the acoustic signal 117 received by the acoustic receiver 120. The ambient noise 119 may be in a sonic range, a subsonic range, an ultrasonic range, or a combination of two or more ranges. The ambient noise 119 may be from any source. For example, the ambient noise 119 may be a sound primarily external to the container, such as a sound proximate to the container 150 other than the excitation signal 115. Such ambient noise may include sound generated by propulsion motors, auxiliary equipment, rotating machinery, sound amplifying equipment, and wheels. The ambient noise 119 may include sound generated by a positional change of the substance within the container, such as a sloshing or gurgling. Alternatively, the ambient noise 119 may include a sound generated by a change in the structure of the container, including a dimensional or volume change of the container 150 over a time, or by an orientation change of the container over a time. Additionally, the ambient noise 119 may include a sound generated by a resonance of the structure of the container 150 independent of the excitation signal 115.

Figure 3:
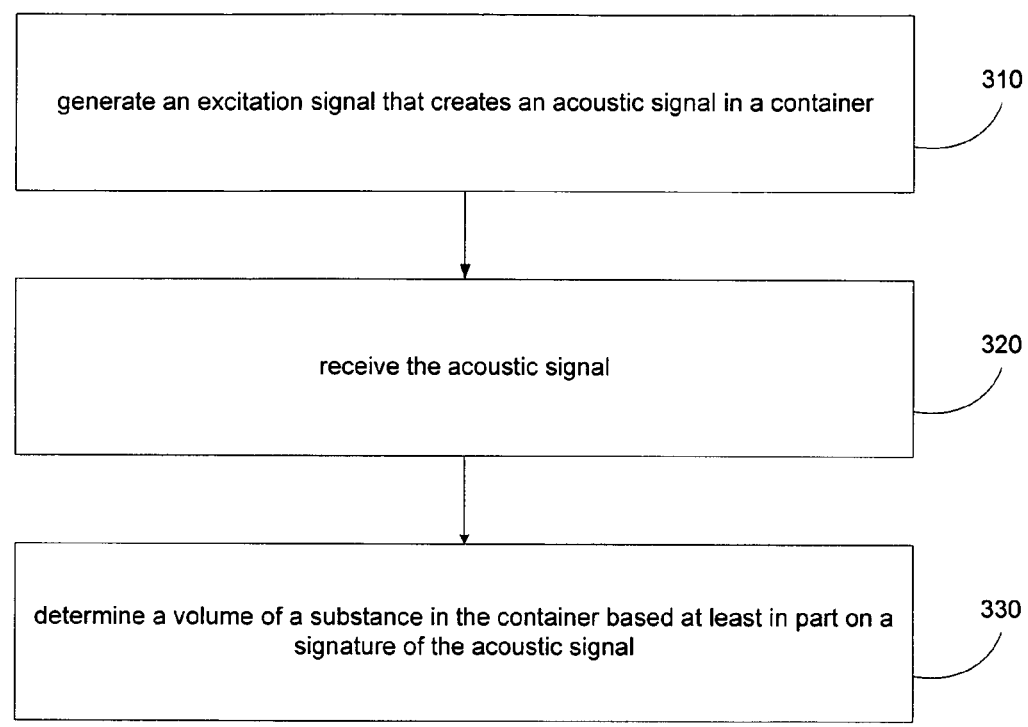
FIG. 3 shows a method for determining an amount of substance in a container.

FIG. 3 generally shows a method 300 for determining a volume of a substance in a container. Method 300 includes steps 310, 320, and 330.

Step 310 illustrates generating an excitation signal 115 that creates an acoustic signal 117 in a container. In one implementation of step 310, such as shown and/or described in relation to FIG. 1, the excitation signal 115 is generated with excitation generator 110. Excitation generator 110 can generate a pulse excitation signal 115, a substantially white noise excitation signal, a substantially single frequency excitation signal, or other kinds of excitation signals. Excitation generator 110 can generate an excitation signal 115 in a gas in container 150, in liquid 155 in container 150, or on a wall of container 150. When a tube is connected to container 150, excitation generator 110 can also inject excitation energy into the tube connected to container 150.

Step 320 shows receiving the acoustic signal 117. In some implementations of step 320, such as shown and/or described in relation to FIG. 1, the acoustic signal is received with an acoustic receiver 120. In some implementations of step 330, a transducer of acoustic receiver 120 converts the acoustic signal 117 to an electrical representation of the acoustic signal. In some implementations of step 330, an amplifier of acoustic receiver 120 amplifies the electrical representation of the acoustic signal to an electrical signal. In some implementations of step 330, an analog-to-digital converter of acoustic receiver 120 digitizes the electrical representation of the acoustic signal 117 and delivers the digitized signal to analytical instrument 130.

Step 330 includes determining a volume of a substance in the container based at least in part on a signature of the acoustic signal 117. In one implementation, the amount of the substance in the container can be determined by comparing a spectrum of the received acoustic signal 117 with one or more spectra in a spectra look up table. In another implementation, at least one resonant frequency in a spectrum of the received acoustic signal 117 is determined, and amount of the substance in the container can be determined by comparing at least one resonant frequency in the spectrum of the received acoustic signal 117 with one or more resonant frequencies in a frequency look up table. A resonant frequency in a spectrum of the received acoustic signal 117 can be determined by detecting a frequency that has a maximum strength in the spectrum of the acoustic signal.

In some implementations of step 330, analytical instrument 130 receives a digitized version of an acoustic signal 117 from the analog-to-digital converter of analytical instrument 130. In some implementations of step 330, upon receipt of the digitized version of the acoustic signal 117, logic of analytical instrument 130 executes a Fourier analysis to determine what frequency of the digitized signal has maximum strength (e.g., via program executing a Fast Fourier Transform on a processor of analytical instrument 130). In some implementations of step 330, logic of analytical instrument 130 designates the determined frequency of maximum strength as the resonant frequency. In some implementations of step 330, logic of analytical instrument 130 then compares the determined resonant frequency against a look up table that contains a list of frequencies in association with volumes of substance in container 150 to select a frequency of the table deemed most proximate to the determined resonant frequency (e.g., via comparison hardware and/or firmware). In some implementations of step 330, logic of analytical instrument 130 designates the volume associated with the selected frequency of the table (e.g., that most proximate to the resonant frequency) to be the volume of the substance in container 150.

Method 300 can also include additional steps. For example, method 300 can include recording a background acoustic signal, such as an ambient sound or ambient noise. In one implementation, the recorded background acoustic signal is first subtracted from the acoustic signal received by the acoustic receiver to obtain a compensated acoustic signal. Then, the compensated acoustic signal is further processed to determine some signatures that can be used for determining a volume of a substance in a container.

Figure 4:
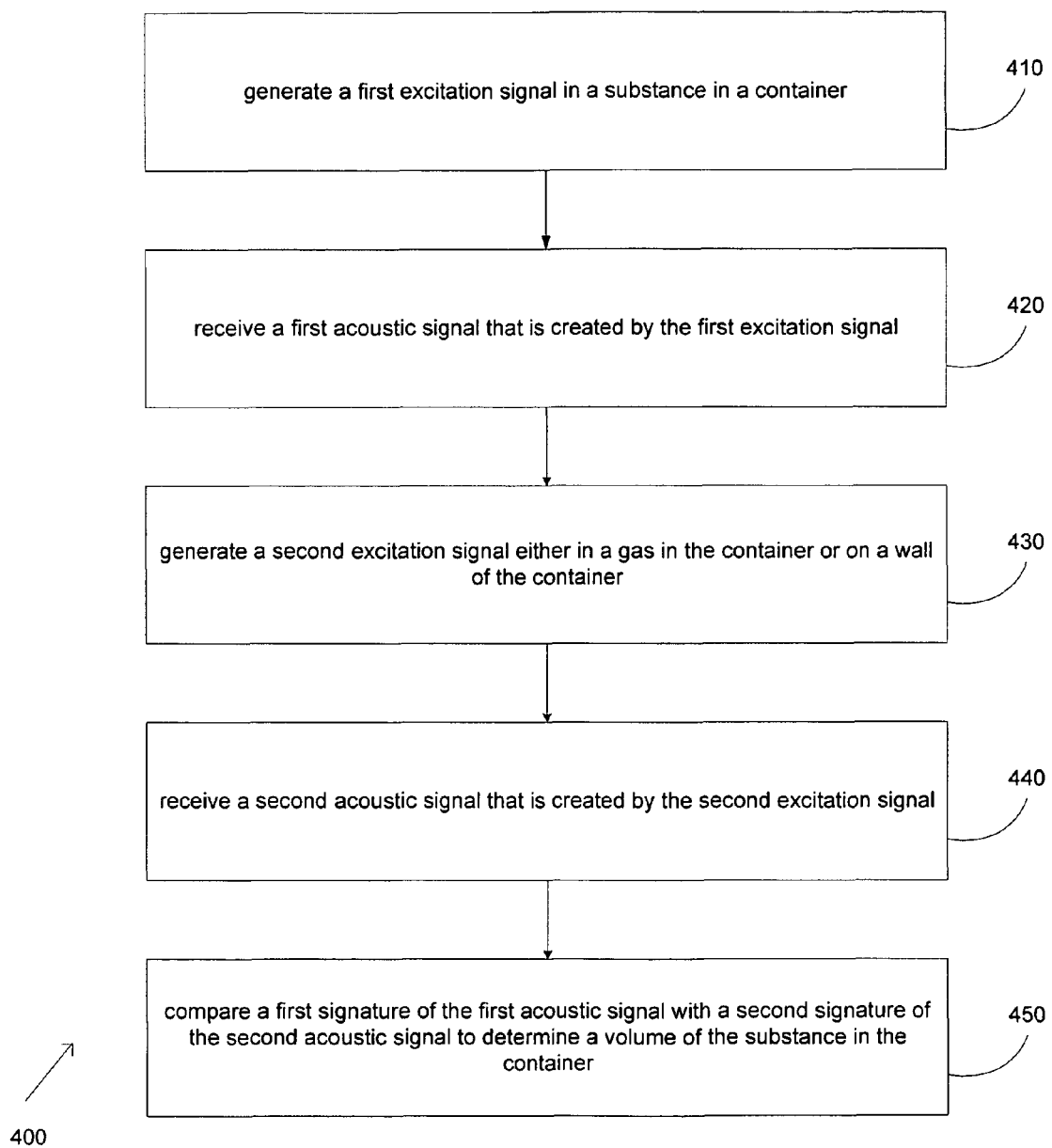
FIG. 4 shows a differential method for determining a volume of a substance in a container.

FIG. 4 generally shows a differential method 400 for determining a volume of a substance in a container. Method 400 includes steps 410, 420, 430, 440, and 450.

In step 410, a first excitation signal is generated in a substance in a container. The first excitation signal creates a first acoustic signal in the container. In step 420, the first acoustic signal is received, for example, with an acoustic receiver. In step 430, a second excitation signal is generated either in a gas in the container or on a wall of the container. The second excitation signal creates a second acoustic signal in the container. In step 440, the second acoustic signal is received, for example, with an acoustic receiver.

In step 450, a signature of the first acoustic signal is compared with a signature of the second acoustic signal to determine a volume of the substance in the container. The signature of the first acoustic signal can be a spectrum of the first acoustic signal, or one or more resonant frequencies in a spectrum of the first acoustic signal. Similarly, the signature of the second acoustic signal can be a spectrum of the second acoustic signal, or one or more resonant frequencies in a spectrum of the second acoustic signal.

Figure 5:
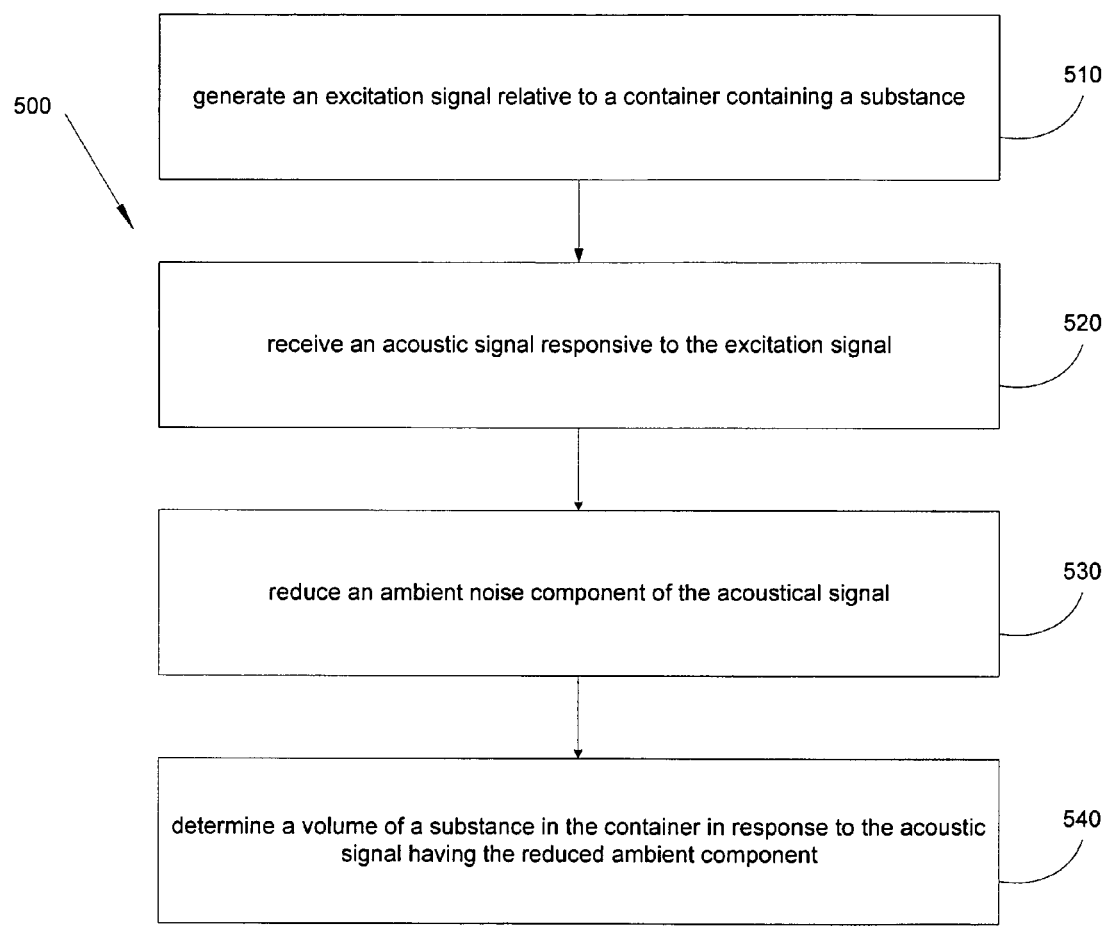
FIG. 5 illustrates exemplary steps of a process 500 that determines a volume of a contained substance in an ambient noise environment.

FIG. 5 illustrates exemplary steps of a process 500 that determines a volume of a contained substance in an ambient noise environment. Method 500 is illustrated by blocks 510, 520, 530, and 540.

At block 510, an excitation signal is generated relative to a container containing a substance, the container being subject to an ambient noise. The acoustic excitation signal may be generated at any suitable location, such as proximate to a portion of the container as illustrated in FIG. 2, within a containment space defined by the container and not occupied by the substance, and within a portion of the substance. At block 520, an acoustic signal responsive to the excitation signal is received. The responsive acoustic signal may be received at any suitable location, such as proximate to a portion of the container, within a containment space defined by the container and not occupied by the substance as illustrated in FIG. 2, and within a portion of the substance.

At block 530, an ambient noise component of the acoustic signal is reduced, including reduction to a point of elimination. The ambient noise component may be reduced using a suitable signal processing technique, such as analog and digital signal processing techniques. In an embodiment, reducing the ambient noise component includes application of a noise canceling algorithm to the received acoustic signal. In another embodiment, reducing the ambient noise component includes modifying the received acoustical signal in response the signal representative of the ambient noise. The modifying may include filtering the received acoustical signal in response the signal representative of the ambient noise. The modifying may include subtracting a signal representative of the ambient noise from the received acoustic signal. A further embodiment includes application of demodulation techniques. Since the frequency or frequency spectrum of the excitation signal is known or may be determined, the ambient noise component in the acoustic signal may be reduced by demodulation with respect to the excitation signal. For example, reducing the ambient noise component may include application of a synchronous demodulation algorithm to the acoustic signal. Other digital signal processing techniques may be used to reduce the ambient noise, including application Fourier transforms, such as a Fast Fourier transform, and a single frequency fast Fourier transform signal, and application of a convolving algorithm.

An embodiment includes receiving a signal representative of the ambient noise, and modifying the received acoustical signal in response the signal representative of the ambient noise. In an alternative of this embodiment, the signal representative of the ambient noise is obtained at a time when the excitation signal 115 is absent. For example, a signal representative of the ambient noise 119 within the container 150 is received by the acoustical receiver 120 when the excitation generator 110 is off and not generating an excitation signal 115. The signal representative of the ambient noise may be saved by the analytical instrument 130. An acoustic signal 117 is received by the acoustic receiver 120 when the excitation generator 110 is on and generates an excitation signal 115. The ambient noise component may be reduced by modifying the received acoustical signal in response the signal representative of the ambient noise. The modification may include subtracting the saved signal representative of the ambient noise from the received acoustic signal 117. In another embodiment of the further embodiment, the signal representative of the ambient noise 119 may be received by a different acoustic receiver, such as the receiver 122 of FIG. 2. Multiple acoustic receivers 120 and 122 allow a continuous referencing of the two signals because the acoustic signal and the signal representative of the ambient noise can be acquired at substantially the same time.

At block 540, a volume of the substance in the container is determined in response to the acoustic signal having the reduced ambient noise component. The volume may be determined using any suitable technique, including those described above. For example, determining the volume of the substance in the container may include determining an acoustic signature of the acoustic signal having the reduced ambient noise component, and comparing the determined acoustic signature with a known acoustic signature of a volume of the substance. A plurality of known acoustic signatures for the container may be correlated with measured substance volumes and saved in a look-up table or other suitable format. Volume, expressed in gallons, pounds, cubic feet, or other convenient measure, may be determined by matching the determined acoustic signature with one or more known acoustic signatures.

In another example, determining the volume of the substance in the container may include comparing a spectrum of an acoustic signature having the reduced ambient noise component with a list of spectra, and determining the volume of the substance in the container in response to the comparing. For example, the air volume of the container increases as the substance decreases. The spectra resonances of the air volume and the substance volume will correspondingly change. The list of spectra may include a spectrum look-up table.

An embodiment of the process 500 includes further elements of generating and providing a signal representative of the determined volume. Such a signal typically would be provided to an on-board computer or an indicator, such as a fuel gauge.

Another embodiment implements the process 500 in a system, such as the system 100 of FIGS. 1 and 2. The system includes a container 150 configured to contain a substance 155, and a signal generator 110 operable to generate an excitation signal 115 within the container. The system also includes an acoustic signal receiver 120 operable to sense acoustic signals within the container, including an acoustic signal 117 responsive to the excitation signal and a noise ambient 119 to the container. The system further includes an analytical instrument 130 operable to perform the process 500. The analytical instrument 130 is further operable provide a signal representative of the determined volume. The analytical instrument 130 is also operable to receive a signal representative of the ambient noise 119 from the acoustic signal receiver 120. A further implementation of the embodiment may include a gauge (not illustrated) to display the determined volume in response to the signal representative of the determined volume, and an engine (not illustrated) configured to consume the substance.

Another further embodiment of the process 500 includes using one excitation signal and receiving at least two acoustic signals responsive to the excitation signal. This embodiment utilizes a multipath propagation of the excitation signal between the excitation generator and acoustic receiver, such as possible multiple paths of the excitation signal 115 between excitation generator 110 and the acoustic receiver 120 of FIGS. 1 and 2. In this further embodiment, at block 520 the process includes receiving a first acoustic signal responsive to the excitation signal and receiving a second acoustic signal representative of the excitation signal. For example, the first acoustic signal may have followed a path primarily within the containment space not occupied by the substance. The second acoustic path may have followed a path that includes the substance. In an alternative example, the first acoustic signal may have followed a path primarily within the structure of the container material. The second acoustic signal may have followed a path primarily within the containment space not occupied by the substance. A single acoustic receiver may be used to receive both the first and second multipath acoustic signals. The single acoustic receiver may be positioned at any suitable location with respect to the container. In an alternative, spaced-apart acoustic receivers may be used to receive multipath signals. The spaced-apart acoustic receivers may be positioned at any suitable location with respect to the container and have any suitable spaced-apart distance.

In this further embodiment, at block 530, an ambient noise component of at least one of the first and second acoustic signals is reduced in response to the first and second acoustic signals. Any analog and/or digital signal processing technique known to those skilled in the art may be used to reduce the ambient noise component. For example, the ambient noise reduction may include modifying the first acoustical signal in response the second acoustical signal. The modification may include subtracting a common component of both the first and second acoustic signals.

In this further embodiment, at block 540, a volume of the substance in the container is determined in response to at least one of the first acoustic signal and the second acoustic signal after the reduction of the ambient noise component. Determining the volume may include a combining of the first acoustic and second acoustic signals.

FIG. 6 illustrates exemplary steps of a process 600 that determines a volume of a contained substance in an ambient noise environment. Method 600 is illustrated by blocks 610, 620, 630, 640, 650, and 660.

At block 610, a first excitation signal is generated relative to a container subject to an ambient noise and containing a substance having a volume. The first excitation signal may be generated at any suitable location, such as proximate to a portion of the container as illustrated in FIG. 2, within a containment space defined by the container 150 and not occupied by the substance, and within a portion of the substance. At block 620, a first acoustic signal is received responsive to the first excitation signal. The first responsive acoustic signal may be received by an acoustic receiver located at any suitable location, such as proximate to a portion of the container, within a containment space defined by the container and not occupied by the substance as illustrated in FIG. 2, and within a portion of the substance.

At block 630, a second excitation signal is generated relative to the container. The second excitation signal may be different from the first excitation signal. Any differentiation may be in their respective frequency spectrums, amplitudes, modulation, or some other differentiating characteristic useful in reducing an ambient noise component. Like the first excitation signal, the second excitation signal may be generated at any suitable location, such as proximate to a portion of the container as illustrated in FIG. 2, within a containment space defined by the container 150 and not occupied by the substance, and within a portion of the substance. In an embodiment, two spaced-apart excitation generators respectively generate the first and second excitation signals, and are positioned relative to the container in locations suitable for the parameters involved. In another embodiment, one excitation generator respectively generates both the first and second excitation signals, typically alternating between signals.

At block 640, a second acoustic signal is received responsive to the second excitation signal. Like the first responsive acoustic signal, the second responsive acoustic signal may be received by an acoustic receiver located at any suitable location, such as proximate to a portion of the container, within a containment space defined by the container and not occupied by the substance as illustrated in FIG. 2, and within a portion of the substance. In an embodiment, two spaced-apart acoustic receivers respectively receive the first and second excitation signals, and are positioned relative to the container in locations suitable for the parameters involved. In another embodiment, one acoustic receiver receives both the first and second acoustic signals. The location and number of excitation signal generators and acoustic receivers may be selected as appropriate for the parameters of the container, the substance, and other design considerations.

At block 650, an ambient noise component is filtered from the first acoustic signal. The filtering reduces the ambient noise component in the first acoustical signal. The filtering may use any method, device, and/or technique, including those described above. The filtering may include reducing an ambient noise component common to the first acoustic signal and the second acoustic signal. Alternatively, the filtering may include modifying the first received acoustical signal in response to the second received acoustical signal. The filtering may include subtracting at least a component of the second first acoustic signal from the first acoustic signal. The filtering may include processing the first acoustic signal using data obtained from the second acoustic signal, or by comparing the first acoustic signal and the second acoustic signal.

In an alternative embodiment, at block 650, an ambient noise component is filtered from the second acoustic signal. The filtering reduces the ambient noise component in the second acoustical signal. As with filtering the first acoustical signal, the filtering may use any method, device, and/or technique, including those described above.

At block 660, the volume of the substance in the container is determined in response to the filtered first acoustic signal. The volume may be determined using any suitable technique, including those described above. In an alternative embodiment, the volume of the substance is determined in response to the filtered first acoustical signal and the filtered second acoustical signal.

In the above, methods and systems for determining a volume of a substance in a container are disclosed. The methods and systems disclosed herein can be implemented or modified to have one or more of the following applications. In one application, methods and systems disclosed herein can be used to determine how much diesel fuel is stored in a tank car, for example, under the condition that the diesel fuel may exhibit foaming or gas entrainment behavior. In another application, number of persons in a room can be determined based at least in part on a resonant frequency of the room, or other signatures of an acoustic signal. In another application, methods and systems disclosed herein can be used to determine a specific condition, such as, whether a volume of a substance stored in a container is above a threshold volume. In the implementation of FIG. 1, a specific condition can be determined by including a conditional filter in analytical instrument 130, and passing the acoustic signal received by acoustic receiver 120 through the conditional filter.

Those having skill in the art will recognize that the state of the art has progressed to the point where there is may be distinction remaining between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. In one embodiment, the subject matter described herein may be implemented via Application Specific Integrated Circuits (ASICs), Field Programmable Gate Arrays (FPGAs), or other integrated formats. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter subject matter described herein are capable of being distributed as a program product in a variety of forms, and that an illustrative embodiment of the subject matter subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular aspects of the present subject matter described herein have been shown and described, it will be obvious to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense of one having skill in the art would understand the convention (e.g., "a system having at least one of A, B, and C" would include but not be limited to systems that have A alone, B alone, C alone, A and B together, A and C together, B and C together, and/or A, B, and C together). In those instances where a convention analogous to "at least one of A, B, or C, etc." is used, in general such a construction is intended in the sense of one having skill in the art would understand the convention (e.g., "a system having at least one of A, B, or C" would include but not be limited to systems that have A alone, B alone, C alone, A and B together, A and C together, B and C together, and/or A, B, and C together).

The invention claimed is:

1. A method comprising:
transmitting an acoustic signal through a liquid substance within a container, the container being subject to an ambient noise, the acoustic signal being transmitted through a volume of the liquid substance prior to an interaction between the acoustic signal and a surface of the container;
receiving the acoustic signal after a propagation of the acoustic signal through the volume of the liquid substance;
reducing an ambient noise component of the acoustic signal;
determining an acoustic signature of the acoustic signal having the reduced ambient noise component, wherein the acoustic signature is at least partially based upon a detected frequency spectrum of the acoustic signal propagated through the volume of the liquid substance; and
determining a volume of the liquid substance in the container by comparing the acoustic signature with an acoustic signature of an acoustic signal propagated through a known volume of the liquid substance.

2. The method of claim 1, wherein generating the excitation signal includes generating the excitation signal within a portion of the container.

3. The method of claim 1, wherein generating the excitation signal includes generating the excitation signal within a portion of the liquid substance.

4. The method of claim 1, wherein ambient noise includes sound primarily external to the container.

5. The method of claim 1, wherein ambient noise includes sound generated by the container other than in response to the excitation signal.

6. The method of claim 1, wherein the ambient noise includes a sound generated by a resonance of the container independent of the excitation signal.

7. The method of claim 1, wherein the ambient noise includes a sound proximate to the container other than the excitation signal.

8. The method of claim 1, wherein receiving the acoustic signal includes receiving the acoustic signal within a portion of the liquid substance.

9. The method of claim 1, wherein receiving the acoustic signal includes receiving the acoustic signal within a portion of the container not occupied by the liquid substance.

10. The method of claim 1, wherein reducing the ambient noise component includes modifying the received acoustic signal in response the signal representative of the ambient noise.

11. The method of claim 10, wherein modifying the received acoustic signal in response the signal representative of the ambient noise includes subtracting a signal representative of the ambient noise from the received acoustic signal.

12. The method of claim 1, wherein reducing the ambient noise component comprises:
  receiving a signal representative of the ambient noise; and
  modifying the received acoustic signal in response to the signal representative of the ambient noise.

13. The method of claim 12, wherein the signal representative of the ambient noise and the acoustic signal are received by the same acoustic receiver.

14. The method of claim 12, wherein the signal representative of the ambient noise is obtained at a time when the excitation signal is absent.

15. The method of claim 12, wherein the signal representative of the ambient noise includes a saved signal representative of the ambient noise.

16. The method of claim 1, wherein reducing the ambient noise component includes application of a convolving algorithm to the acoustic signal.

17. The method of claim 1, wherein determining the volume of the liquid substance in the container by comparing the acoustic signature with an acoustic signature of an acoustic signal propagated through a known volume of the liquid substance includes:
  comparing the detected frequency spectrum of the acoustic signal propagated through the liquid substance with a list of spectra including at least one frequency spectrum associated an acoustic signal propagated through a known volume of the liquid substance.

18. The method of claim 17, wherein the list of spectra includes a spectrum look-up table.

19. The method of claim 1, further including providing a volume signal representative of the determined volume.

20. A computer-readable media containing computer instructions which, when run on a computer, cause the computer to perform the method of claim 1.

21. The computer-readable media of claim 20, wherein the computer-readable media includes a computer storage media.

22. The computer-readable media of claim 21, wherein the computer storage media is carried by a computer readable carrier.

23. The computer-readable media of claim 20, wherein the computer-readable media includes a communications media.

24. A method comprising:
  transmitting an acoustic signal through a liquid substance within a container, the container being subject to an ambient noise, the acoustic signal being transmitted through a volume of the liquid substance prior to an interaction between the acoustic signal and a surface of the container;
  receiving the acoustic signal after a propagation of the acoustic signal through the volume of the liquid substance;
  detecting at least one frequency of the acoustic signal; and
  determining the volume of the liquid substance in the container by comparing the detected at least one frequency of the acoustic signal with at least one frequency corresponding to a propagation of the acoustic signal through a known volume of the liquid substance.

* * * * *

UNITED STATES PATENT AND TRADEMARK OFFICE
CERTIFICATE OF CORRECTION

PATENT NO. : 9,046,402 B2
APPLICATION NO. : 10/930425
DATED : June 2, 2015
INVENTOR(S) : Bran Ferren et al.

It is certified that error appears in the above-identified patent and that said Letters Patent is hereby corrected as shown below:

On the Title Page

On page 1 under Item (73) Assignee, "The Invention Sciencefund I, LLC," should read --The Invention Science Fund I, LLC--

In the Claims

In Column 14, Line 62, Claim 10, "signal in response the signal representative of the ambient" should read --signal in response to the signal representative of the ambient--

In Column 14, Line 65, Claim 11, "received acoustic signal in response the signal representative" should read --received acoustic signal in response to the signal representative--

Signed and Sealed this
Eighth Day of December, 2015

Michelle K. Lee
*Director of the United States Patent and Trademark Office*